(12) United States Patent
Nishida et al.

(10) Patent No.: US 6,807,330 B2
(45) Date of Patent: Oct. 19, 2004

(54) OPTICAL SWITCH USING AN OPTICAL WAVEGUIDE

(75) Inventors: Naoki Nishida, Kusatsu (JP); Takuji Hatano, Suita (JP); Koji Takahara, Amagasaki (JP); Shinji Maruyama, Yokohama (JP); Miyuki Teramoto, Takatsuki (JP); Koujirou Sekine, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 29 days.

(21) Appl. No.: 10/037,976

(22) Filed: Jan. 3, 2002

(65) Prior Publication Data

US 2002/0150323 A1 Oct. 17, 2002

(30) Foreign Application Priority Data

Jan. 9, 2001 (JP) .......................................... 2001-001724

(51) Int. Cl.[7] .............................................. G02B 6/35
(52) U.S. Cl. ........................................... 385/16; 385/19
(58) Field of Search ....................................... 385/16–23

(56) References Cited

U.S. PATENT DOCUMENTS

| 4,818,052 | A | * | 4/1989 | Le Pesant et al. ............. 385/17 |
| 4,991,925 | A | * | 2/1991 | Mitchell et al. .............. 385/18 |
| 5,632,876 | A | * | 5/1997 | Zanzucchi et al. ........... 204/600 |
| 5,699,462 | A | | 12/1997 | Fouquet et al. ............... 385/18 |
| 6,320,996 | B1 | * | 11/2001 | Scobey et al. ................ 385/18 |
| 6,324,316 | B1 | * | 11/2001 | Fouquet et al. ............... 385/16 |
| 6,356,679 | B1 | * | 3/2002 | Kapany ........................ 385/18 |
| 6,360,775 | B1 | * | 3/2002 | Barth et al. .................. 137/828 |
| 6,363,183 | B1 | * | 3/2002 | Koh ............................. 385/19 |
| 6,389,189 | B1 | * | 5/2002 | Edwards et al. .............. 385/18 |
| 6,445,845 | B1 | * | 9/2002 | Sakata et al. ................. 385/18 |
| 6,493,482 | B1 | * | 12/2002 | Al-hemyari et al. .......... 385/19 |
| 6,510,259 | B1 | * | 1/2003 | Al-hemyari ................... 385/16 |
| 2002/0044721 | A1 | * | 4/2002 | Bjorklund ..................... 385/18 |
| 2002/0048425 | A1 | * | 4/2002 | McBride et al. .............. 385/16 |
| 2002/0076140 | A1 | * | 6/2002 | Kobrin ......................... 385/18 |

FOREIGN PATENT DOCUMENTS

| JP | 06-177838 A | 6/1994 |
| JP | 2000-121967 A | 4/2000 |

\* cited by examiner

*Primary Examiner*—John D Lee
(74) *Attorney, Agent, or Firm*—Sidley Austin Brown & Wood LLP (57) ABSTRACT

Disclosed herein is an optical switch for changing over a running direction of a light passing through an optical waveguide between a first direction and a second direction by moving a switching member disposed on an optical path of an optical waveguide. The switching member has a plurality of switching positions for selectively guiding each of lights of at least two different wavelengths into the first direction or second direction.

17 Claims, 9 Drawing Sheets

OPTICAL SWITCH USING AN OPTICAL WAVEGUIDE

CROSS-REFERENCE TO RELATED APPLICATION

This application is based on Japanese Patent Application No. 2001-001724 filed in Japan on Jan. 9, 2001, the entire content of which is hereby incorporated by reference.

BACKGROUND OF THE INVENTION

1. Field of the Invention

The present invention relates to an optical switch for reflecting or transmitting light by a switching member disposed on an optical path of an optical waveguide, and changing the running direction of light by the moving of the switching member.

2. Description of the Related Art

A conventional optical switch is disclosed, for example, in Japanese Unexamined Patent Publication No. 2000-121967A. In this optical switch, a micro mirror disposed on an optical path of luminous flux emitted from an optical fiber is supported by a movable plate, and the movable plate is moved by applying a voltage to move the micro mirror away from the optical path, so that forwarding and reflecting of light are changed over.

On the other hand, U.S. Pat. No. 5,699,462 discloses an optical switch in which grooves obliquely crossing two intersecting optical waveguides are provided, bubbles are formed in the liquid filling the grooves, and bubbles are heated and moved by a micro heater. In this optical switch, the refractive index of the filling liquid and the refractive index of the optical waveguide are set nearly equal, and therefore when the liquid is placed on the optical path of the optical waveguide, the light goes straightly forward, and when bubbles are placed, the light is reflected and the running direction is changed over.

Recently, the so-called wavelength multiplex communication is developed, in which different pieces of information are put on light (carrier) of different wavelengths, and plural carriers are superposed, so that a large quantity of information can be transmitted by one optical fiber. According to such conventional optical switch, however, the lights multiplexed in wavelength are uniformly reflected or transmitted, and pieces of information put on different carriers cannot be issued separately. Accordingly, information is taken out by filtering by a branching filter, and the optical communication system having the optical switch is complicated in configuration.

Besides, the optical switch disclosed in the above mentioned Japanese Unexamined Patent Publication No. 2000-121967A requires a collimator lens in order to issue the exit light from the optical fiber to the optical fiber by reflecting or transmitting by the micro mirror. The optical switch disclosed in U.S. Pat. No. 5,699,462 requires a micro heater for heating and a mechanism for releasing its heat. As a result, the optical switch is complicated in either case.

SUMMARY OF THE INVENTION

It is hence a primary object of the invention to present an optical switch capable of issuing wavelength multiplexed lights separately. It is also an object of the invention to present an optical switch simple in structure.

To achieve the objects, the optical switch reflecting one aspect of the invention is an optical switch for changing over the running direction of the light passing through an optical waveguide between a first direction and a second direction by moving a switching member disposed on an optical path of an optical waveguide, in which the switching member has plural switching positions, and these switching positions selectively guide each of lights of at least two different wavelengths into the first direction or second direction.

According to this configuration, by moving the switching member, the switching positions disposed on the optical path can be changed over, and lights of at least two different wavelengths can be guided selectively into the first direction or second direction. Further, by properly setting the position of the switching member, both switching positions can be kept away from the optical path. Therefore, for example, when the switching member is moved away from the optical path of the optical waveguide, the wavelength multiplexed incident light runs forward straightly, and when the switching member is disposed on the optical path of the optical waveguide, light of one wavelength passes and light of other wavelength is reflected.

Moreover, in the configuration, the switching member may be also configured to move within the groove intersecting with the optical waveguide. The groove may be filled with liquid, and in this case by moving the liquid in the groove by a micro pump coupled to the groove, the switching member may be moved.

Further, in the configuration, each switching position may be an interference filter.

The optical switch reflecting other aspect of the invention comprises a groove intersecting with an optical waveguide and filled with liquid, a switching member movably provided in the groove, and a micro pump coupled to the groove for transferring the liquid in the groove.

According to this configuration, when the micro pump is driven, the liquid in the groove intersecting with the optical waveguide is fed, and the switching member moves in the groove. As a result, when the liquid and optical wave guide, for example, are matched in refractive index, by moving the switching member away from the optical path of the optical waveguide, the wavelength multiplexed incident light runs straightly forward, or by placing the switching member on the optical path of the optical waveguide, the incident light is reflected.

In this configuration, the micro pump may comprise a piezoelectric element, and in this case, by controlling the voltage applied to the piezoelectric element, optical switching operation may be realized.

Further, a plurality of any one of these optical switches may be disposed on a same optical path. In this configuration, wavelength multiplexed light is transmitted to one optical path having n optical switches arranged in series, and a light of a desired wavelength may be guided into a desired output port out of n output ports.

BRIEF DESCRIPTION OF THE DRAWINGS

These and other objects, advantages and features of the invention will become apparent from the following description thereof taken in conjunction with the accompanying drawing s in which.

DESCRIPTION OF PREFERRED EMBODIMENTS

Figure 1:
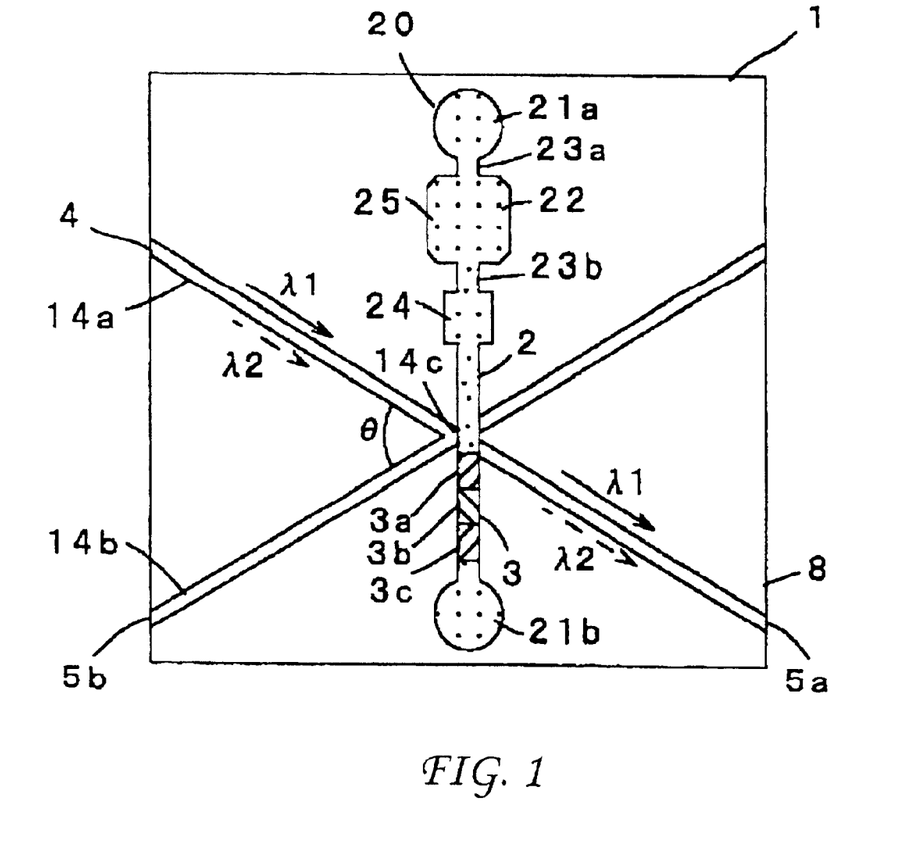
FIG. 1 is a plan showing a state in transmission mode of optical switch in embodiment 1 of the invention.

Referring now to the drawings, preferred embodiments of the invention are described below. FIG. 1 is a plan showing an optical switch in an embodiment of the invention, depicting a state after dismounting a diaphragm described below. An optical switch 1 has two waveguides 14a, 14b intersecting at a specified crossing angle θ disposed on a main body 8, and a groove 2 crossing the intersection 14a is formed. A sectional view along the waveguide 14a is shown in FIG. 2, in which the main body 8 is composed by forming a lower clad layer 11, a waveguide 14, and an upper clad layer 15 on a substrate 10.

Figure 3A:
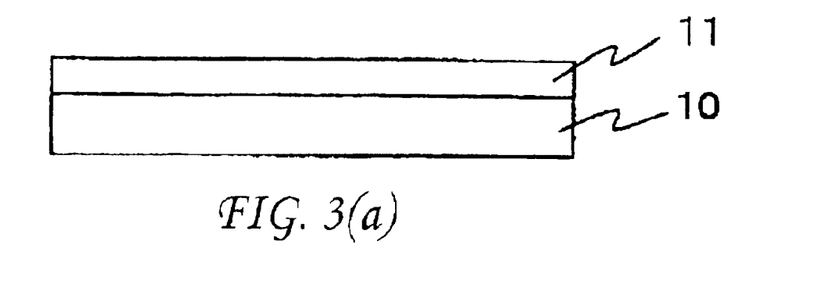
FIG. 3(a) through FIG. 3(d) are side sectional views showing a manufacturing method of main body of optical switch in embodiment 1 of the invention.
Figure 3B:
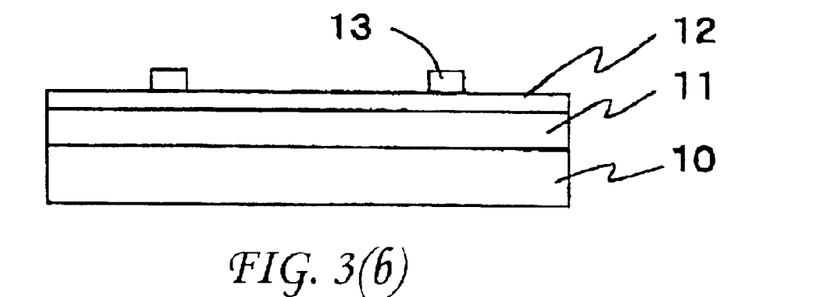

A manufacturing method of the main body 8 is shown in FIG. 3(a) through FIG. 3(d). As shown in FIG. 3(a), on the substrate 10 made of Si or the like, the lower clad layer 11 made of quartz or the like is formed by CVD or other process. On the lower clad layer 11, as shown in FIG. 3(b), a core layer 12 made of quartz or the like is formed. Since the lower clad layer 11 is doped with fluorine or the like, its refractive index is larger than that of the core layer 12. The core layer 12 is coated with a resist 13 by spin coating or other process, and is patterned in a specified shape by exposure and development.

Figure 3C:
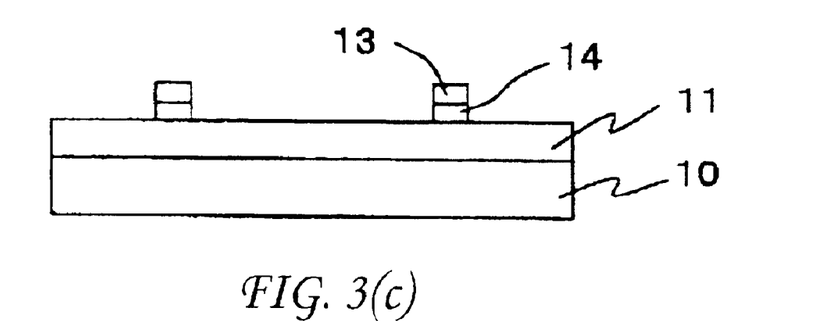
Figure 3D:
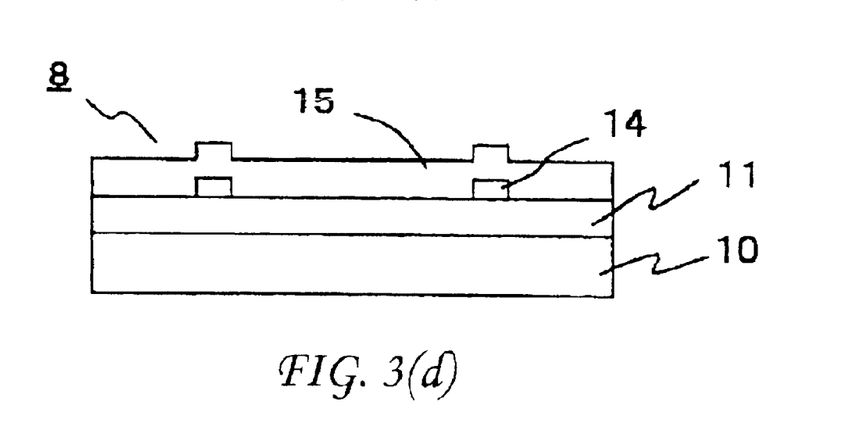

Next, as shown in FIG. 3(c), by etching the core layer 12 by RIE or other process, a waveguide 14 of a specified shape is formed. In the case of the core layer 12 made of quartz, $CHF_3$ or $CF_4$ is used as reactive gas of RIE. After peeling the resist 13, as shown in FIG. 3(d), an upper clad layer 15 of same material as the lower clad layer 11 is formed while doping fluorine or the like. This produces the main body 8 for guiding the incident light by the waveguide 14 being enclosed by the lower clad layer 11 and upper clad layer 15 low in refractive index.

Figure 2:
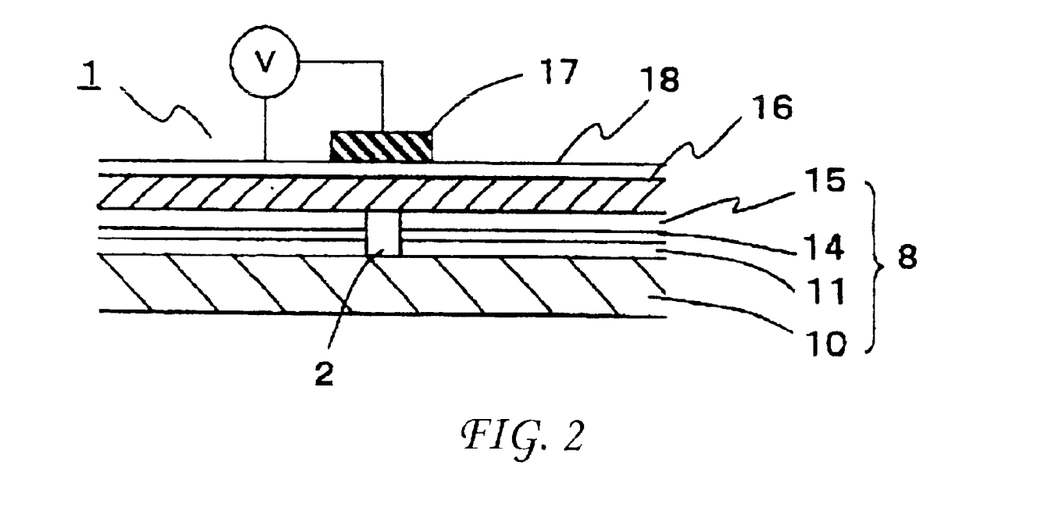
FIG. 2 is a side sectional view of optical switch in embodiment 1 of the invention.

In FIG. 2, on the main body 8, a diaphragm 16 having an electrode 18 made of ITO or the like patterned in a specified shape is adhered. On this diaphragm 16, a piezoelectric element 17 made of PZT (lead zirconic acid titanate) or the like is adhered. When a voltage is applied between the upper surface of the piezoelectric element 17 and the electrode 18, the diaphragm 16 is deformed.

Figure 4A:
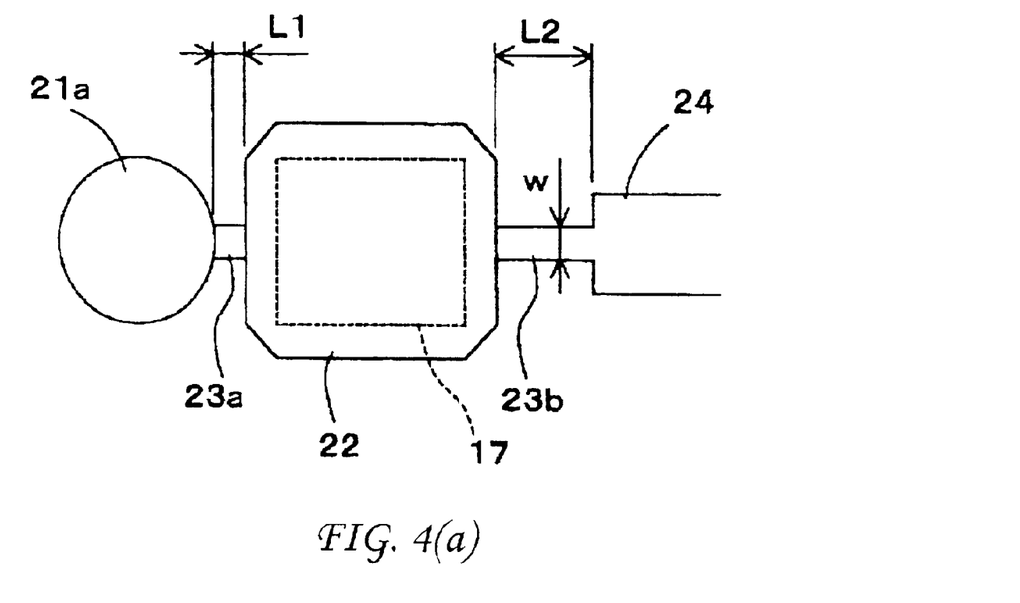
FIG. 4(a) and FIG. 4(b) are diagrams showing a configuration of micro pump of optical switch in embodiment 1 of the invention.
Figure 4B:
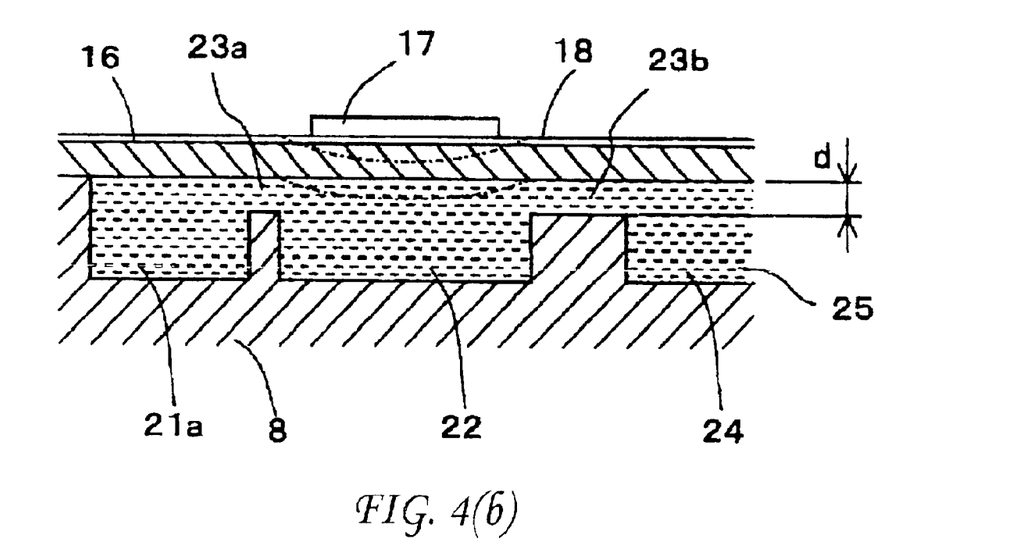

FIG. 4(a) and (b) are plan and sectional view showing essential parts of the groove 2. The groove 2 is filled with matching oil 25 equal in refractive index to the waveguides 14a, 14b (see FIG. 1). At both ends of the groove 2, there are reservoirs 21a, 21b for holding the matching oil 25 (see FIG. 1). A pump compartment 22 is formed beneath the piezoelectric element 17. The reservoir 21a and pump compartment 22 are coupled by way of a first diffuser 23a.

The pump compartment 22 is further coupled to a diffusion compartment 24 at the opposite side of the reservoir 21a by way of a second diffuser 23b. When a voltage is applied to the piezoelectric element 17 in a specific period, as indicated by single dot chain line in the diagram, the diaphragm 17 locally vibrates up and down, so that the matching oil 25 flows in the groove 2.

The width (w) and depth (d) of the first and second diffusers 23a, 23b are formed smaller than those of the reservoir 21a, pump compartment 22, and diffusion compartment 24, and therefore the passage resistance of the matching oil 25 is large. The length L21 of the first diffuser 23a is shorter than the length L2 of the second diffuser 23b. Accordingly, the matching oil 25 passing in the second diffuser 23b is nearly a laminar flow, whereas turbulence or vortex is formed in the matching oil 25 passing in the first diffuser 23a.

Figure 5:
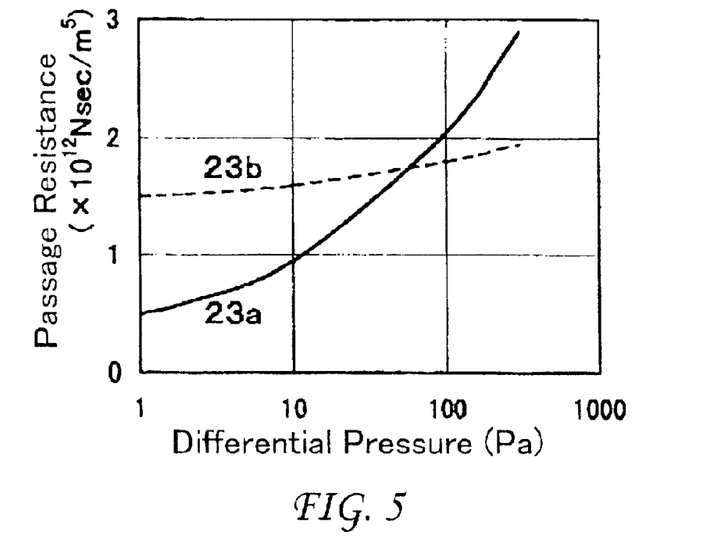
FIG. 5 is a diagram explaining operation of micro pump of optical switch in embodiment 1 of the invention.

As a result, the passage resistance of the first and second diffusers 23a, 23b is as shown in FIG. 5. In the diagram, the axis of ordinates represents the passage resistance (unit:× $10^{12}$ Nsec/$m^5$), and the axis of abscissas denotes the differential pressure (unit: Pa) at both ends of the first and second diffusers 23a, 23b expressed on the logarithmic scale. Also experimental values are shown in the conditions of w=25 μm, d=100 μm, L1=20 μm, and L2=150 μm, and the depth of the reservoir 21a, pump compartment 22 and diffusion compartment 25 is matched with the depth (d) of the first and second diffusers 23a, 23b.

In the diagram, since the length L1 of the first diffuser 23a is short, when the differential pressure is small, the passage resistance is smaller than in the second diffuser 23b. However, in the second diffuser 23b, although the increase of passage resistance relative to the differential pressure is moderate, the increase is substantial in the first diffuser 23a due to turbulence or vortex. Accordingly, as the differential pressure increases, the first diffuser 23a becomes larger in passage resistance than the second diffuser 23b.

Therefore, when the pressure in the pump compartment 22 is small, the matching oil 25 is more likely to flow into the first diffuser 23a, and when the pressure in the pump compartment 22 is large, the matching oil 25 more smoothly flows into the second diffuser 23b.

Figure 6A:
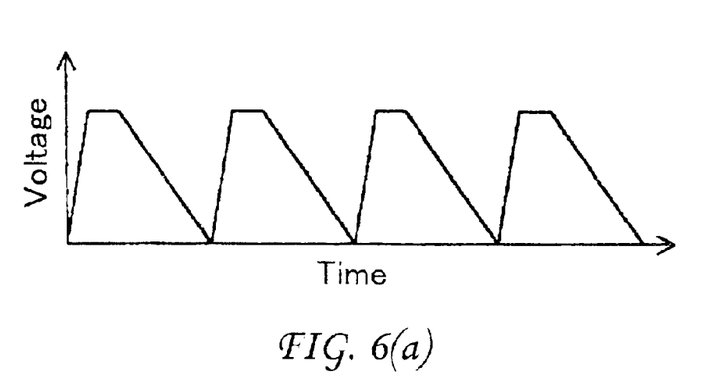
FIG. 6(a) and FIG. 6(b) are diagrams showing voltage applied to the piezoelectric element of micro pump of optical switch in embodiment 1 of the invention.

As understood from these results, when the voltage applied to the piezoelectric element 17 is a sharp rising sawtooth waveform as shown in FIG. 6(a), the pressure in the pump compartment 22 instantly hikes up. As a result, the amount of matching oil 25 flowing out from the second diffuser 23b is greater than the amount flowing out from the first diffuser 23a, so that the matching oil 25 flows, in average, to the right side in FIG. 4(a), (b).

Figure 6B:
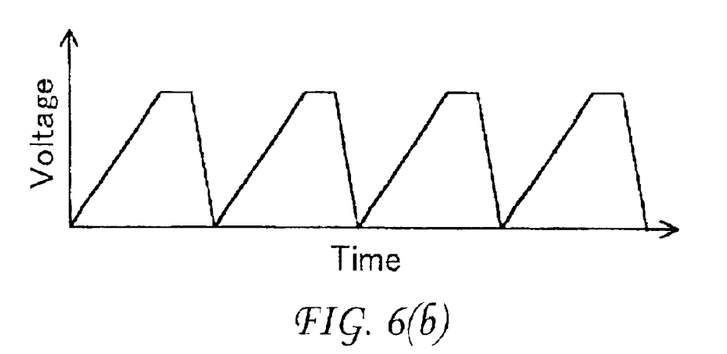

By contrast, when the voltage applied to the piezoelectric element 17 is a mild rising sawtooth waveform as shown in FIG. 6(b), the pressure in the pump compartment 22 increases gradually, and the amount of matching oil 25 flowing out from the first diffuser 23a is greater than the amount flowing out from the second diffuser 23b, so that the matching oil 25 flows, in average, to the left side in FIG. 4(a), (b). In this way, the micro pump 20 is composed of groove 2, diaphragm 16, and piezoelectric element 17.

In FIG. 1, a filter 3 disposed in the groove 3, and is immersed in matching oil 25. Along with flow of the matching oil 25, the filter 3 can be moved in the groove 2. The filter 3 is composed of three interference filters 3a to 3c different in optical characteristics. A manufacturing method of the filter 3 is shown in FIG. 7(a) to (f).

Figure 7A:
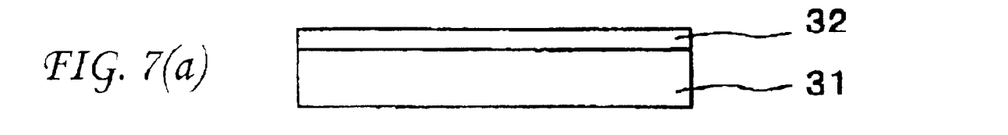
FIG. 7(a) through FIG. 7(f) are side sectional views showing a manufacturing method of filter of optical switch in embodiment 1 of the invention.
Figure 7B:
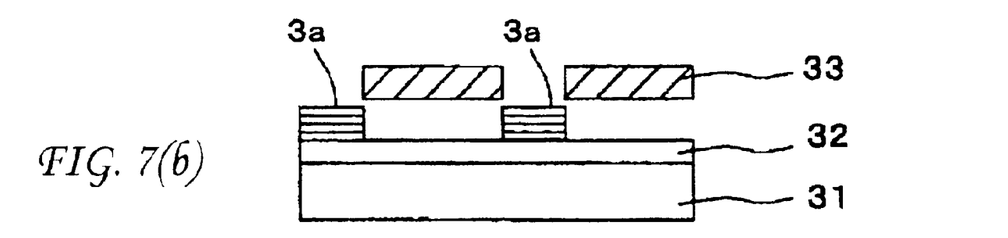

As shown in FIG. 7(a), on a base 31 of silicon or the like, a substrate material such as fluorinated polyimide or the like is applied, heated, and cured, and a substrate 32 is formed. Next, as shown in FIG. 7(b), a mask 33 is disposed on the substrate 32, and plural thin film materials different in refractive index are laminated by vapor deposition or the like, and an interference filter 3a is formed.

Figure 7C:
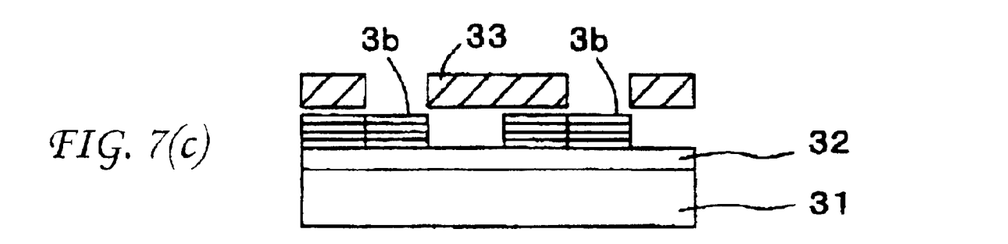
Figure 7D:
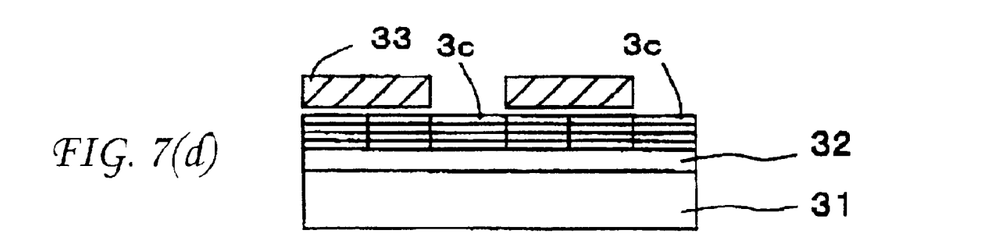
Figure 7E:
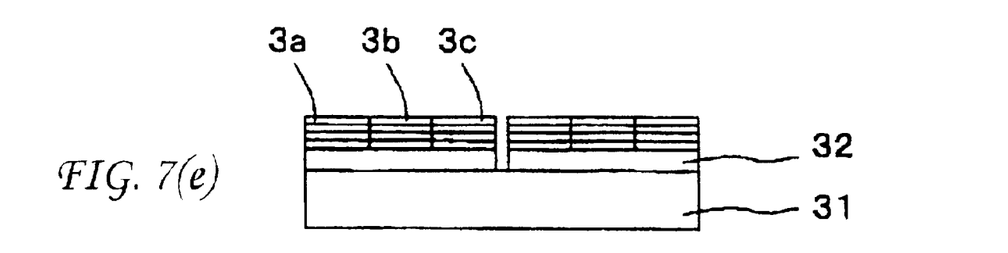
Figure 7F:
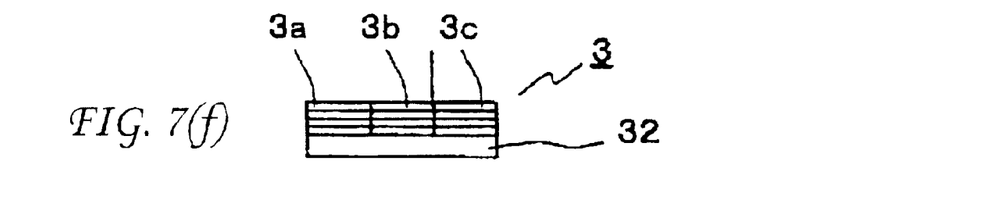

Similarly, as shown in FIG. 7(c) and (d), thin film materials are laminated by vapor deposition or the like, and interference filters 3b, 3c are formed. Then, as shown in FIG. 7(e), cutting off at specified positions by dicing saw or the like, the substrate 32 is separated from the base 31, and a filter 3 having interference filters 3a to 3c different in optical characteristics disposed parallel on the substrate 32 is obtained (FIG. 7(f)).

Figure 8:
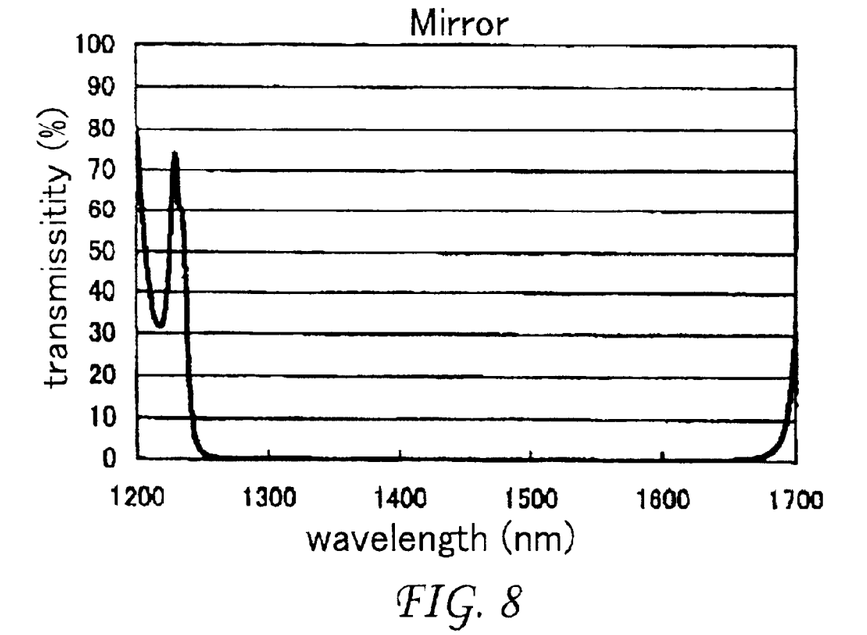
FIG. 8 is a diagram showing transmissivity of a first interference filter of optical switch in embodiment 1 of the invention.
Figure 9:
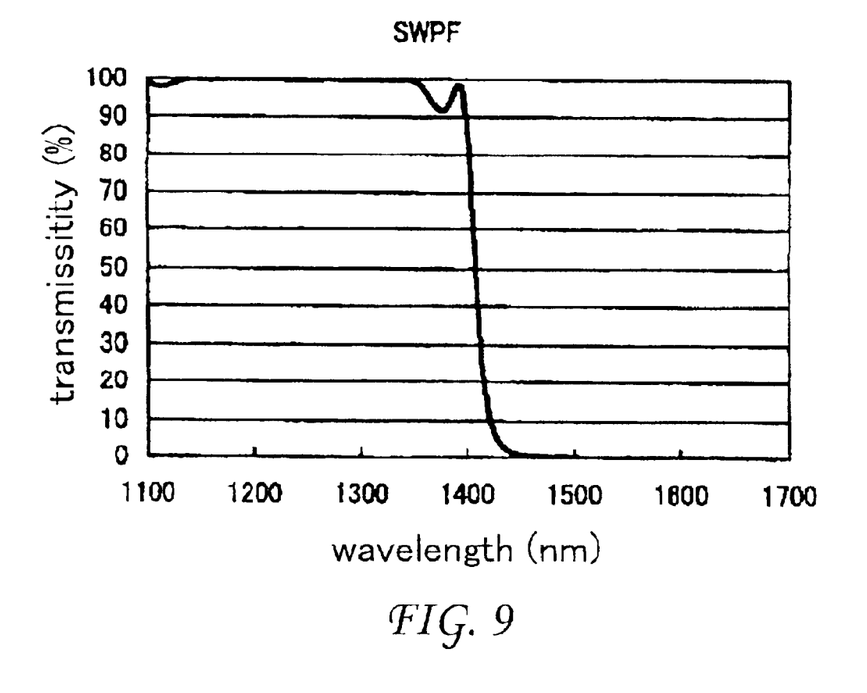
FIG. 9 is a diagram showing transmissivity of a second interference filter of optical switch in embodiment 1 of the invention.
Figure 10:
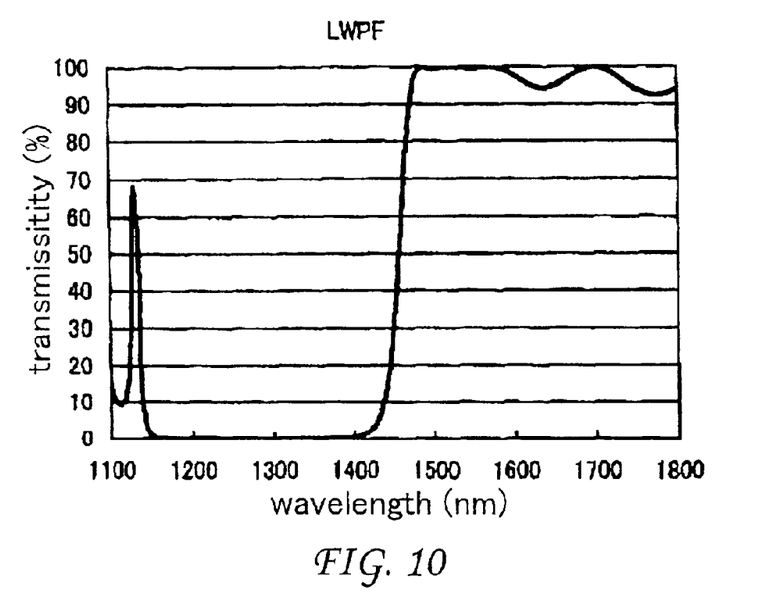
FIG. 10 is a diagram showing transmissivity of a third interference filter of optical switch in embodiment 1 of the invention.

For example, the operation is explained in the case of the optical switch having the interference filters 3a to 3c formed so as to exhibit the optical characteristics as shown in FIG. 8 to FIG. 10. Luminous flux entering the optical switch 1 consists of light of wavelength λ1 (=1.3 μm) and light of wavelength λ2 (=1.55 μm), which are multiplexed in wavelength in one optical fiber by a fiber coupler, and entered from an input port 4 (see FIG. 1).

When the optical switch 1 is put in transmission mode, as shown in FIG. 1, the micro pump 20 drives and the filter 3 is moved away from the intersection 14c of the waveguides 14a, 14b. The lights of wavelengths λ1 and λ2 pass through the matching oil 25 equal in refractive index to the waveguide 14a, and goes straight forward in the waveguide 14a. The lights come out from a first output port 5a.

Figure 11:
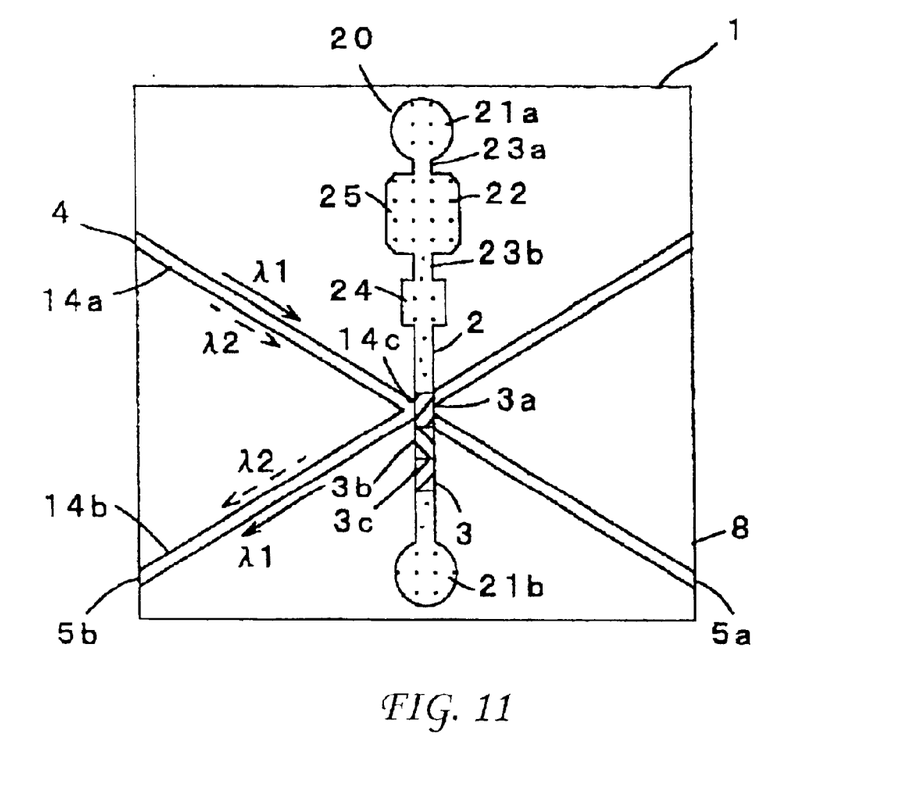
FIG. 11 is a plan showing a state of reflection mode of optical switch in embodiment 1 of the invention.

When the optical switch 1 is in reflection mode, as shown in FIG. 11, the micro pump 20 drives and interference filter 3a of the filter 3 is placed at the intersection 14c of the waveguides 14a, 14b. The interference filter 3a is about 0% in transmissivity at wavelengths λ1 and λ2 (see FIG. 8). Accordingly, the lights of wavelengths λ1 and λ2 entering from the input port 4 are reflected by the filter 3, and run through the waveguide 14b, and come out from a second output port 5b.

Figure 12:
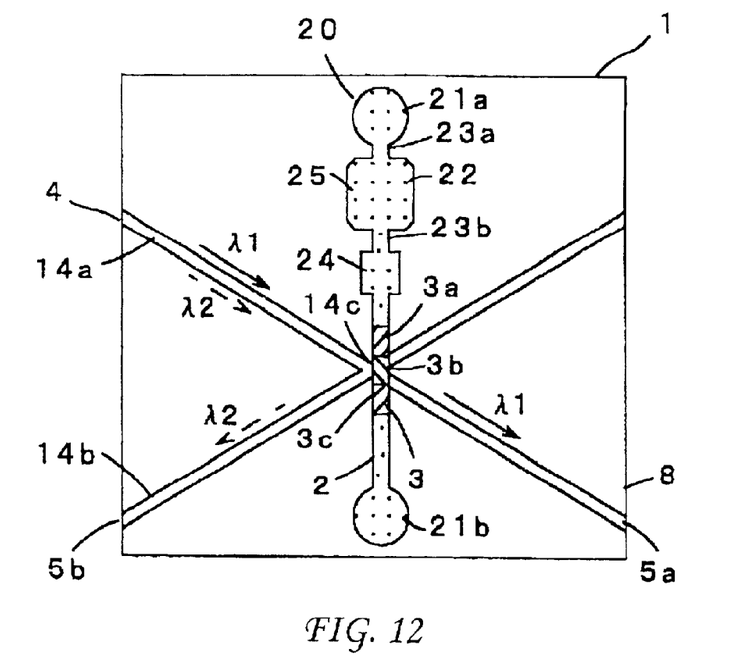
FIG. 12 is a plan showing a partial transmission state of optical switch in embodiment 1 of the invention.

As shown in FIG. 12, as the micro pump 20 drives, when the interference filter 3b of the filter 3 is disposed at the intersection 14c of the waveguides 14a, 14b, the interference filter 3a is about 100% in transmissivity at wavelength λ1 and about 0% at wavelength λ2 (see FIG. 9). Accordingly, the light of wavelength λ1 entering from the input port 4 passes through the filter 3, and goes straight forward in the waveguide 14a, and comes out from the first output port 5a. The light of wavelength λ2 is reflected by the filter 3, and runs through the waveguide 14b, and comes out from the second output port 5b.

Figure 13:
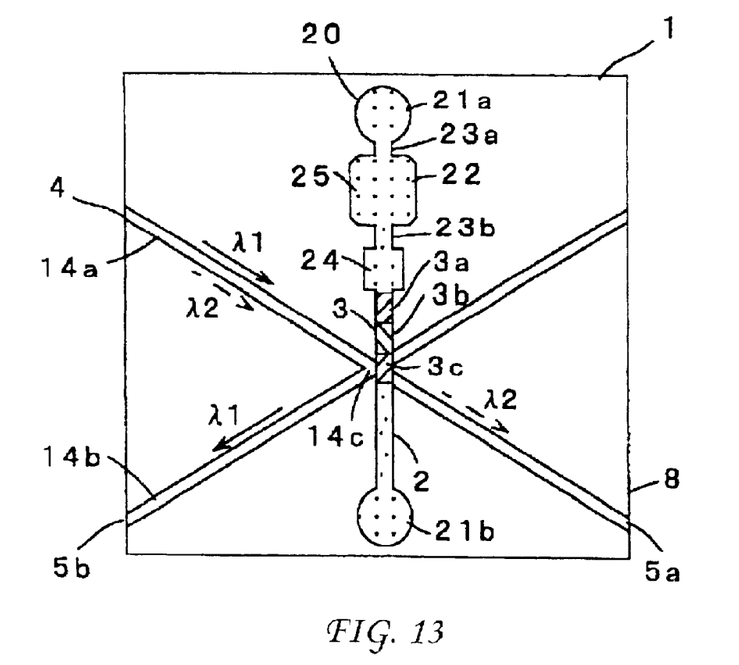
FIG. 13 is a plan showing a partial transmission state of optical switch in embodiment 1 of the invention.

As shown in FIG. 13, as the micro pump 20 drives, when the interference filter 3c of the filter 3 is disposed at the intersection 14c of the waveguides 14a, 14b, the interference filter 3a is about 0% in transmissivity at wavelength λ1 and about 100% at wavelength λ2 (see FIG. 10). Accordingly, the light of wavelength λ2 entering from the input port 4 passes through the filter 3, and goes straight forward in the waveguide 14a, and comes out from the first output port 5a. The light of wavelength λ1 is reflected by the filter 3, and runs through the waveguide 14b, and comes out from the second output port 5b.

Figure 14:
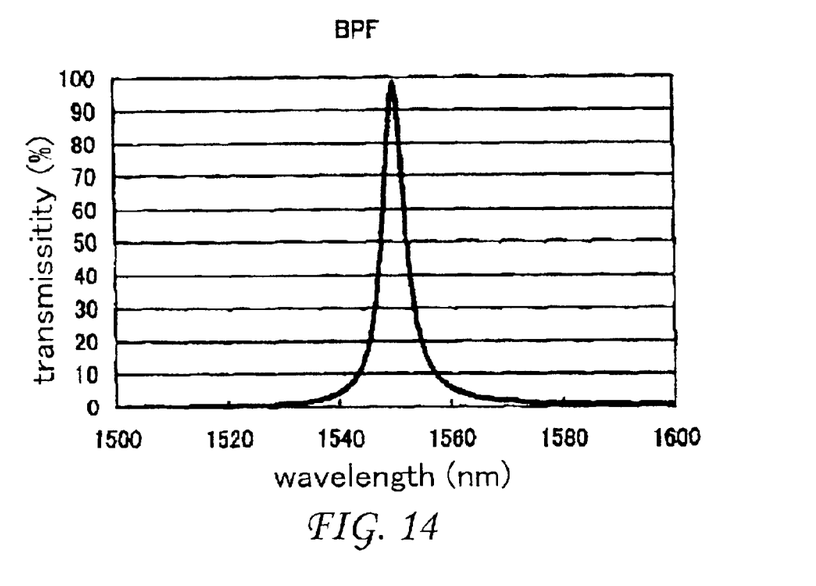
FIG. 14 is a diagram showing transmissivity of other interference filter of optical switch in embodiment 1 of the invention.

Therefore, by moving the filter 3 by driving the micro pump 20, the wavelength multiplexed luminous flux superposing carriers of plural wavelengths can be changed over in any one of total reflection, total transmission, partial transmission, and partial reflection. Further, as shown in FIG. 14, the interference filter may be also designed in a narrow band so as to pass only light of wavelength of 1.55 μm.

According to the embodiment, wavelength multiplexed incident lights can be switched by each wavelength and issued separately, and branching filter is not particularly required, and the optical communication system can be simplified.

Instead of the filter, meanwhile, micro mirror or other switching member may be disposed in the groove. In this configuration, although wavelength selectivity is not achieved, the switching member disposed at intersection of waveguides can be moved by a micro pump using a piezoelectric element, so that an optical switch not requiring collimator lens or heat release mechanism can be realized.

Figure 15:
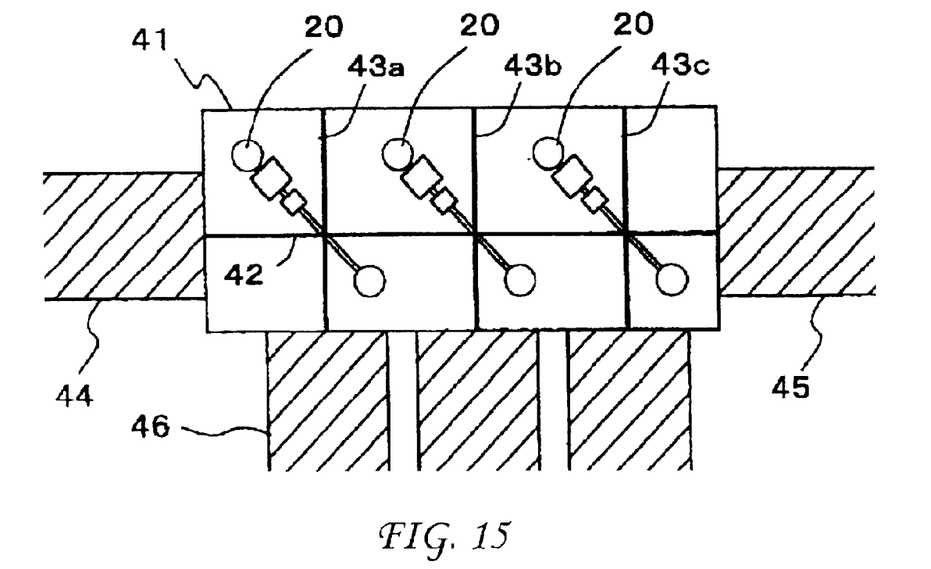
FIG. 15 is a plan showing an optical switch in embodiment 2 of the invention.

FIG. 15 is a plan showing an optical switch in embodiment 2 of the invention. In this embodiment, an optical switch row 41 is formed by disposing same optical switches as in embodiment 1 in a straight line. The optical switch row 41 crosses with a waveguide 42 and waveguides 43a to 43c, and at each intersection, a same micro pump 20 as in embodiment 1 is disposed.

At the input side (left side in the drawing) of the waveguide 42, an optical fiber 44 is connected, and at the output side (right side in the drawing) of the waveguide 42, an optical fiber 45 is connected. At the output side (lower side in the drawing) of the waveguides 43a to 43c, each optical fiber of an optical fiber array 45 is connected.

When a wavelength multiplexed luminous flux superposing lights of plural wavelengths is entered from the optical fiber 44, the micro pump 20 is driven to move the filter 3 disposed in the groove 2 (see FIG. 1), so that the lights can be issued from different optical fibers depending on the wavelength.

For example, n pieces of lights multiplexed in wavelength can be directly put into 1×n pieces of optical switches without being branched into optical fibers, and lights of arbitrary wavelengths can be issued to n pieces of optical fibers for output. Therefore, the expensive AWG used in the prior art is not needed, and the number of optical switches is curtailed, and the loss of light can be reduced.

EXAMPLES OF EXPERIMENT

The optical switch 1 of embodiment 1 was manufactured in the following specification, and the operation of the optical switch 1 was evaluated. The interference filters 3a to 3c were manufactured according to the optical characteristics shown in FIG. 8 to FIG. 10.

TABLE

Specification of Optical Switch 1

| Main body | Substrate | Material | Silicon |
|---|---|---|---|
| | Lower clad layer | Material | Quartz |
| | | Thickness | 20 μm |
| | | Refractive index | 1.4626 |
| | Waveguide | Material | Quartz |
| | | Thickness | 7 μm |
| | | Refractive index | 1.4670 |
| | | Crossing angle θ | 10° |
| | Upper clad layer | Material | Quartz |
| | | Thickness | 20 μm |
| | | Refractive index | 1.4626 |
| | Groove | Depth | 100 μm |
| | Diffuser | Depth d × width w | 25 μm × 20 μm |
| Diaphragm | | Material | Borosilicate glass |
| | | Thickness | 70 μm |
| Piezoelectric element | | Material | PZT |
| | | Max. voltage | 60 V |
| | | Frequency | 11 kHz |
| Matching oil | | Refractive index | 1.4626 |
| Filter | Substrate | Material | Fluorinated polyimide |
| | | Thickness | 5 μm |
| | | Refractive index | 1.52 |
| | Interference filter | Material | Lamination of $SiO_2$ and $TiO_2$ |
| | | Refractive index | $SiO_2$: 1.46, $TiO_2$: 2.3 |
| | | Number of layers | 31 |
| | | Width | 20 μm × 3 |
| Wavelengths of incident lights λ1, λ2 | | | 1.3 μm, 1.55 μm |

As a result, lights of wavelengths λ1, λ2 entering from the input port 4 were issued from the first output port 5a in transmission mode (see FIG. 1), and from the second output port 5b in reflection mode (see FIG. 11). In the case of partial transmission and partial reflection (see FIG. 12 and FIG. 13), outputs were respectively obtained from the first and second output ports 5a, 5b, and the insertion loss at this time was 2 dB, and the extinction ratio was 30 dB. The filter 3 is moved at a speed of $2 \times 10^4$ μm/sec, and the maximum moving distance necessary for changeover is 80 μm (20×4), and therefore the switching speed is 4 msec.

As clear from the explanation herein, according to the optical switch of the embodiment, since the switching member disposed on the optical path of the optical waveguide guides the light in different directions depending on the wavelengths, so that the wavelength multiplexed incident lights can be switched and issued separately depending on the wavelength. Therefore, branching filter is not needed, and the optical communication system using the optical switch can be simplified.

Further, composing the switching member by using interference filters, by moving in the groove crossing with the optical waveguides, an optical switch having a wavelength selectivity can be easily composed.

Moreover, by disposing the switching member at the intersection of optical waveguides, and by moving the switching member by a micro pump using a piezoelectric element, the optical switch not using the collimator lens or heat release mechanism as required in the prior art can be realized.

Still more, by disposing a plurality of optical switches in one optical path, the wavelength multiplexed lights can be directly put into optical switches arranged in series without being branched into optical fibers, and lights of arbitrary wavelengths can be issued to optical fibers for output. The expensive AWG (arrayed wave gating) used in the prior art is not needed, and the number of optical switches is curtailed, and the loss of light can be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical switch for changing over a running direction of a light passing through an optical waveguide between a first direction and a second direction by moving a switching member disposed on an optical path of an optical waveguide, wherein the switching member has a plurality of switching portions for selectively guiding each of lights of at least two different wavelengths into the first direction or second direction, respectively, and the switching member is moved by applying pressure to a liquid in contact with the switching member.

2. An optical switch according to claim 1, wherein the plurality of switching portions includes a first switching portion and a second switching portion, wherein the first switching portion is for guiding lights of first and second wavelengths into the first and second directions, respectively, and wherein the second switching portion is for guiding lights of the first and second wavelengths into the second and first directions.

3. An optical switch according to claim 2, wherein the plurality of switching portions further includes a third switching portion for guiding lights of the first and second wavelengths into one of the first and second directions.

4. An optical switch according to claim 1, wherein the switching member is configured to move within a groove intersecting with the optical waveguide.

5. An optical switch according to claim 4, wherein the groove is filled with the liquid.

6. An optical switch according to claim 5, wherein the switching member is moved by moving the liquid in the groove.

7. An optical switch according to claim 6, wherein the liquid is moved in the groove by a micro pump coupled to the groove.

8. An optical switch according to claim 1, wherein at least one of the plurality of switching portions comprises an interference filter.

9. An optical switch according to claim 1, wherein the switching member comprises an interference filter.

10. An optical switch comprising:
   a groove intersecting with an optical waveguide and filled with liquid;
   a switching member movably provided in the groove; and
   a micro pump coupled to the groove for transferring the liquid in the groove to cause the switching member to move within the groove in response to pressure applied from the pump via the liquid.

11. An optical switch according to claim 10, wherein the micro pump comprises a piezoelectric element.

12. An optical switch according to claim 10, wherein the micro pump has no valve therein.

13. An optical switch according to claim 10, wherein at least a part of the switching member has a refractive index different from that of the liquid.

14. An optical switch for changing over a running direction of a plurality of different wavelengths of light passing through an optical waveguide between a first direction and a second direction, said optical switch comprising:
   a switching member disposed on an optical path of the optical waveguide, said switching member having a plurality of switching portions for selectively guiding each of the plurality of different wavelengths of light independently into one of the first direction and the second direction depending on a position of said switching member, wherein the switching member is moved by applying pressure to a liquid in contact with the switching member.

15. An optical switch according to claim 14, wherein the plurality of switching portions includes a first switching portion and a second switching portion, wherein the first switching portion is for guiding lights of first and second wavelengths into the first and second directions, respectively, and wherein the second switching portion is for guiding lights of the first and second wavelengths into the second and first directions, respectively.

16. An optical switch according to claim 15, wherein the plurality of switching portions further includes a third switching portion for guiding lights of the first and second wavelengths into one of the first and second directions.

17. An optical switch according to claim 14, wherein the switching member is configured to move within a groove intersecting with the optical waveguide.

* * * * *